(12) United States Patent
Lu et al.

(10) Patent No.: US 8,752,752 B2
(45) Date of Patent: Jun. 17, 2014

(54) METHOD OF MAKING A COMPOSITE STEEL PLATE

(75) Inventors: Jian Lu, Hong Kong (CN); Junbao Zhang, Shanghai (CN); Aiying Chen, Shanghai (CN)

(73) Assignee: Hong Kong Polytechnic University, Kowloon (HK)

( * ) Notice: Subject to any disclaimer, the term of this patent is extended or adjusted under 35 U.S.C. 154(b) by 471 days.

(21) Appl. No.: 12/400,279

(22) Filed: Mar. 9, 2009

(65) Prior Publication Data

US 2010/0227192 A1 Sep. 9, 2010

(51) Int. Cl.
  *B23K 20/04* (2006.01)
  *B32B 5/14* (2006.01)
  *B32B 15/01* (2006.01)

(52) U.S. Cl.
  USPC ........... 228/117; 148/320; 148/529; 148/564; 228/115; 228/116; 228/193; 428/547; 428/610; 428/638

(58) Field of Classification Search
  USPC .......... 228/115, 116, 117; 148/564, 320, 529; 428/610, 547, 638
  See application file for complete search history.

(56) References Cited

U.S. PATENT DOCUMENTS

| | | | |
|---|---|---|---|
| 4,466,842 A | 8/1984 | Yada et al. | |
| 5,080,727 A | 1/1992 | Aihara et al. | |
| 6,027,587 A | 2/2000 | Hodgson et al. | |
| 6,926,780 B2 | 8/2005 | Xiong et al. | |
| 7,662,207 B2 | 2/2010 | Miura et al. | |
| 2004/0238083 A1* | 12/2004 | Baek et al. | 148/653 |

FOREIGN PATENT DOCUMENTS

| | | |
|---|---|---|
| CN | 1272554 A | 11/2000 |
| CN | 2604443 Y | 2/2004 |
| CN | 1632138 A | 6/2005 |
| EP | 1 031 632 A2 | 2/2000 |
| JP | 2000-73152 A | 3/2000 |
| JP | 2003-183730 A | 7/2003 |

OTHER PUBLICATIONS

Waltz et al. "Combination of surface nanocrystallization and co-rolling", Scripta Materialia, Available online Sep. 2008, p. 21-24.*
Lu et al.; "Nanostructured surface layer on metallic materials induced by surface mechanical attrition treatment", *Materials Science and Engineering*, A375-377, pp. 36-45, (2004).
Liu et al.; "Low Carbon Steel with Nanostructured Surface Layer Induced by High-Energy Shot Peening", *Scripta mater*, vol. 44, Nos. 8/9, pp. 1791-1795, (2001).
Wang et al.; "letters to nature", *Nature*, vol. 419, pp. 912-915, (Oct. 2002).

(Continued)

*Primary Examiner* — Devang R Patel
(74) *Attorney, Agent, or Firm* — Leydig, Voit & Mayer, Ltd.

(57) ABSTRACT

A composite steel plate includes at least two steel sheets rolled to form a plate. One of the sheets has a composition that varies in a depthwise direction, between nanocrystalline and micron grained. The plate is made by treating a steel sheet to produce a composition in the sheet that varies in a depthwise direction of the sheet between nanocrystalline and micron grained, stacking the treated sheet with at least one other steel sheet, and rolling the stacked sheets to form the plate.

21 Claims, 7 Drawing Sheets

(56) References Cited

OTHER PUBLICATIONS

Witkin et al.; "Al—Mg alloy engineered with bimodal grain size for high strength and increased ductility", *Scripta Materialia*, 49, pp. 297-302, (2003).

F.H. Samuel, et al.; "Effect of Dynamic Recrystallization of Microstructural Evolution during Strip Rolling", *ISU Internat'l.*, vol. 30, pp. 216-225, (1990).

Y. Ma, et al.; "A repetitive thermomechanical process to produce nano-crystalline in a metastable austenitic steel", *Scripta Materialia*, 52, pp. 1311-1315, (2005).

Y. Lin, et al.; "Surface nanocrystallization by surface mechanical attrition treatment and its effect on structure and properties of plasma nitride AISI 321 stainless steel", *Acta Materialia*, 54, pp. 5599-5605, (2006).

* cited by examiner

METHOD OF MAKING A COMPOSITE STEEL PLATE

BACKGROUND TO THE INVENTION

1. Field of the Invention

This invention relates to a nano-composite steel plate with layered nanostructure, which characterized by periodic distribution of nano-/micrograined layer resulting in a high strength and large ductility, and to a method of making such a steel plate.

2. Background of the Invention

The machinery industry requires steel materials that have high strength, enhanced formability and environment-friendly performance. The strength of steel materials is generally improved by alloying, i.e. by the addition of an alloy element, such as Cr, Ni, Mo, Mn, Ti and W and the like. However, alloying is relatively expensive and environmentally unfriendly. Another method of strengthening steel is grain refinement that introduces refined microstructures into the steel by thermomechanical and plastic deformation processes. These refined microstructures enhance the strength of the steel compared with the conventional coarse grain steel. The technique of strengthening by refinement attracts more and more attentions for its low cost, recycleability, high purification and little alloying.

The patent literature described several methods of introduces refined microstructures into the steel. Chinese patent 1297062 and European patent 1031632 describe a thermomechanical process for producing steel with a refined ferrite grain size of 3 μm or less, which involves heating the base plate at Ac3 point for austenizing, forging at a temperature range of between Ac3-150° C., or less than 550° C., at strain rate of 0.001-10/s, and then cooling to room temperature to obtain refined grains. Japanese patent 2000073 152 introduces an accumulative roll-bonding method by repeated stacking and rolling to refine the grain size to submicron scale. Chinese patent 127554 employs an integrated processing of pre-treatment by transformation, plastic deformation and recrystalline to achieve nanocrystalline plate with low alloying (CrM0V). However, the research shows that ultra-fine grained steels, that is steel having a grain size less than 1 μm, exhibit increased strength increases but lower plasticity. The deterioration of plasticity is accelerated with the decrease of the grain size. When the grain size extends to the nano-scale, the steels even exhibit a transition from ductile material to brittle material, which is very unfavorable for engineering applications.

In situ formed composite like microstructures, such as a bimodal grain size distribution, can attain large ductility induced by dislocation accumulation of coarse grains while maintaining the majority of the strengthening brought forth by nanostructure. This idea obtains a primary effect in pure Cu (Nature, 2002, 419:912) and Al alloys (Scripta Materialia, 2003, 49:297). An example can be found in Chinese patent publication 1655376A which describes the processing of submicron grained steel plate with nano-precipitates. However, these methods are limited to laboratory applications and are difficult to implement in industrial or commercial applications. Further, the properties of the resulting materials are instability for the inhomogeneous microstructure.

Chinese patent publications 1410560A and 1410560A, Chinese utility model 2604443Y, US patent publication 2003/0127160 A1 and Japanese patent 2003183730, describe various surface nanocrystalline techniques aimed at overcoming the above disadvantages. The common characters of these kinds of surface nanocrystalline techniques are refinement of grain size to nano scale in steel surface in certain depth by using mechanical processing, or transformation treatment. A good combination of mechanical properties is developed by utilizing the fine grain strengthening in the steel surface layer and plasticity providing by conventional grain in centre. However, an obvious disadvantage of these treatments is limited in strengthening much lower than the ultra-fine grained materials (d<1 μm), since the thickness of the nanocrystallized layer is generally within a depth of 50 μm resulting in a volume fraction of nanocrystalline lower than 5% even in a sheet steel. For example, the strength of low carbon steel with a thickness of 3% nanostructured layers is enhanced by 35% treated by surface mechanical attrition treatment (Scripta Mater, 2001, 44(8/9):1791). As to a 316L stainless steel with 2% volume fraction of nanostructured layer, the tensile strength is increased 13% (Mater. Sci. Eng. A, 2004, 375-377: 38). Hence, the influence of surface nanocrystalline on the strength is reduced gradually when the thickness of the steel plate increases. Therefore, the current techniques can not meet the demands of the high strength, large ductility and toughness of nano materials.

SUMMARY OF THE INVENTION

The current invention discloses a composite steel plate in which at least two steel sheets rolled to form a plate. One of the sheets has a composition that varies in a depthwise direction between nanocrystalline and micron grained. The plate is made by treating a steel sheet to produce a composition in the sheet that varies in a depthwise direction of the sheet between nanocrystalline and micron grained, stacking the treated sheet with at least one other steel sheet and rolling the sheets to form the plate. Preferably an odd number of sheets rolled to form a plate, with only a single rolling being employed.

The variations in composition can include one or other or both of grain size (nanocrystalline and micron grained for example) and phase distribution (austenitic and martensitic for example) through the sheet. The type of variation in composition is not critical to the invention and can include variations in direction and between sheets. The surface roughness of the sheets may also vary between 0.05 μm and 10 μm (Ra).

Variations in the composition through the plate can be obtained by various treating of sheets to obtain various compositions that are uniform or vary through the sheets and then stacking various combinations of sheets.

The staked sheets are heat to between room temperature and 0.5 Tm, preferably 150° C. and 0.4 Tm, (wherein Tm is the sheet melting point) prior to rolling.

The plate can also be annealed in a final step.

Further aspects of the invention will become apparent from the following description.

BRIEF DESCRIPTION OF THE DRAWINGS

An exemplary form of the present invention will now be described by way of example only and with reference to the accompanying drawings, in which.

DESCRIPTION OF THE EXEMPLARY EMBODIMENTS

Figure 2:
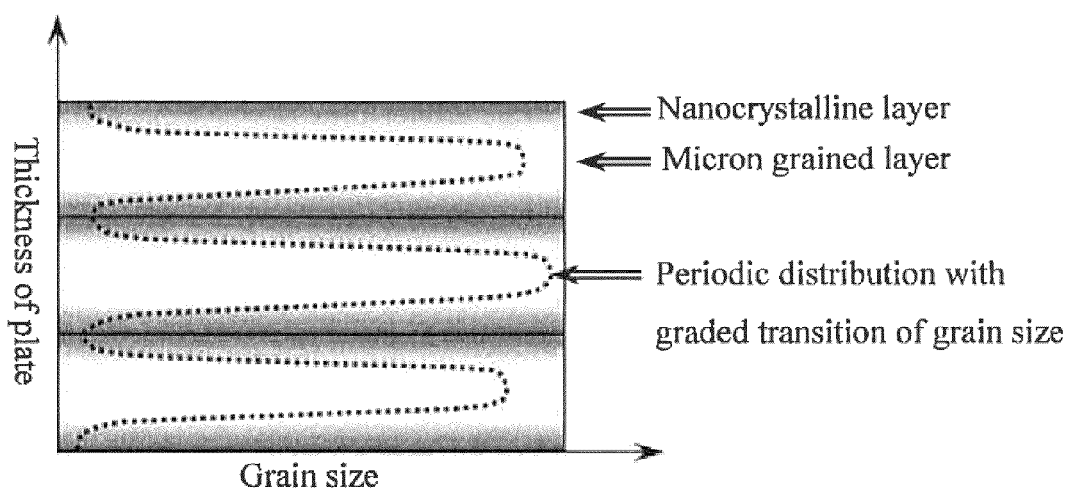
FIG. 2 is a schematic diagram of a method of making the steel plate of FIG. 1.
Figure 3A:
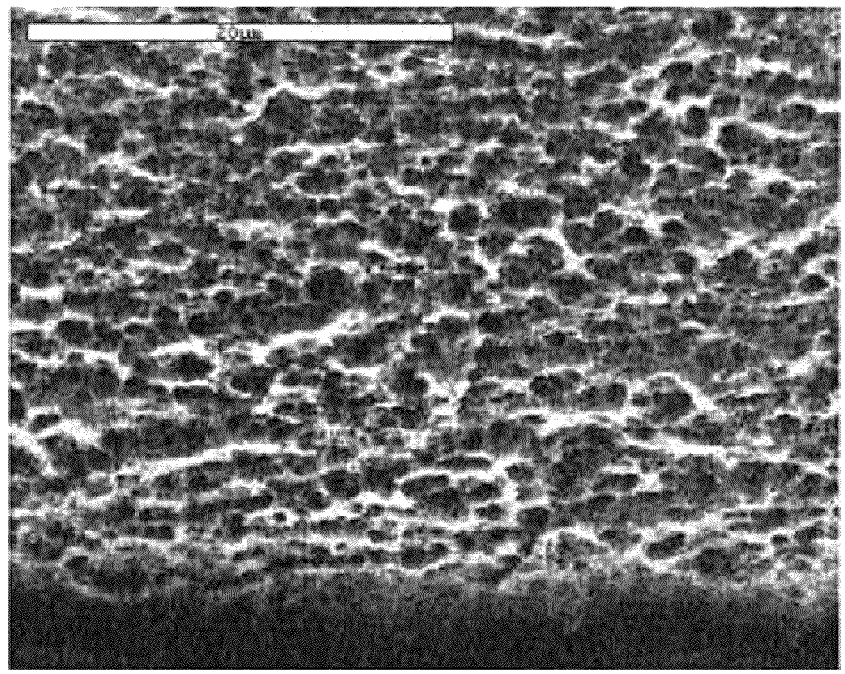
FIG. 3A is a scanning electron micrograph of ultra-fine grains close to surface of the produced steel plate in Example 1.
Figure 3B:
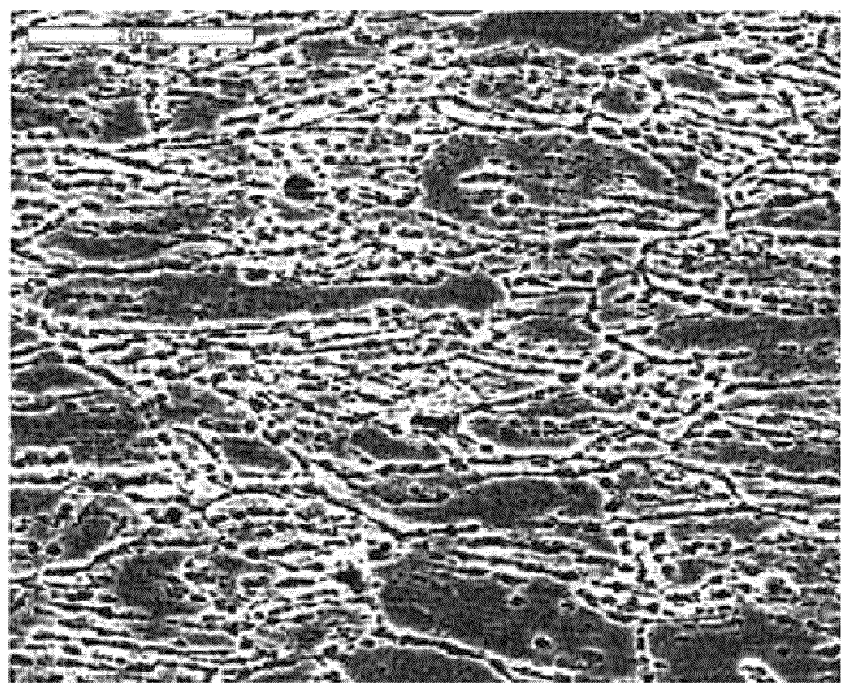
FIG. 3B is a scanning electron micrograph of micron grains in centre of the produced steel plate in Example 1.
Figure 3C:
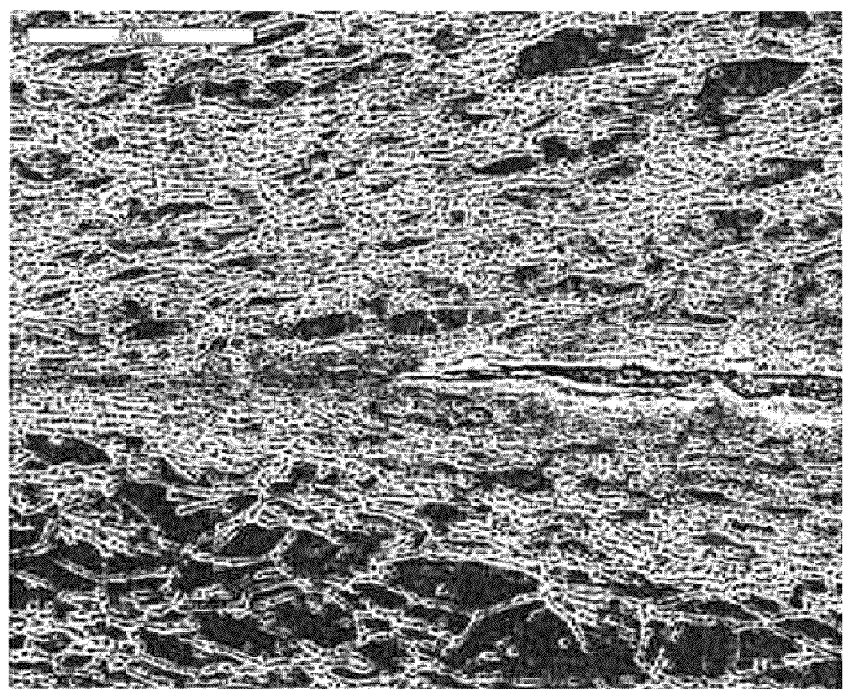
FIG. 3C is a scanning electron micrograph of interface of the produced steel plate in Example 1, indicating the weak interface and the strong interface in the rolling interface.
Figure 4:
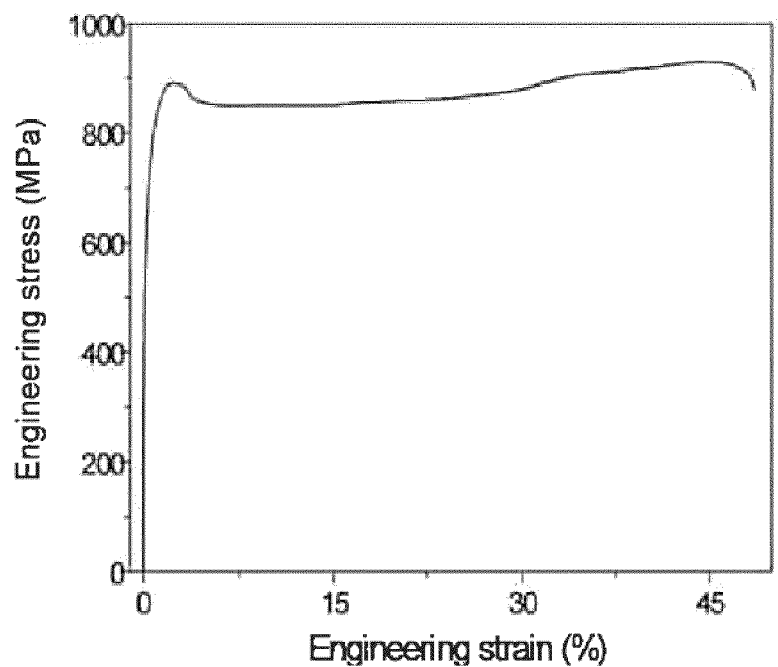
FIG. 4 is the engineering stress-strain curve of the produced steel plate in Example 1.
Figure 5A:
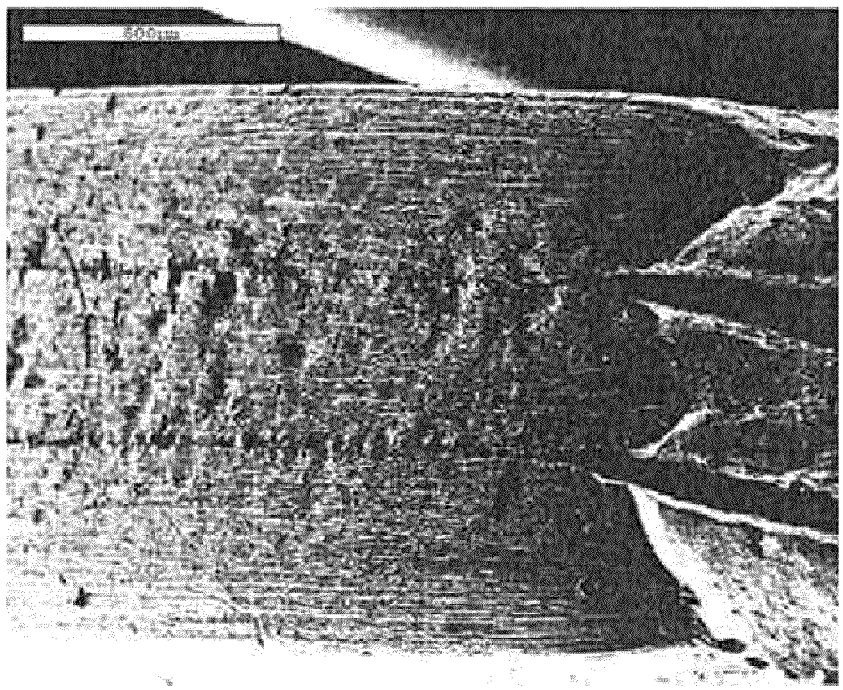
FIG. 5A is a scanning electron micrograph in normal direction of the produced steel plate in Example 1 after tensile test, indicating the manner of the crack deflecting and bridging.
Figure 5B:
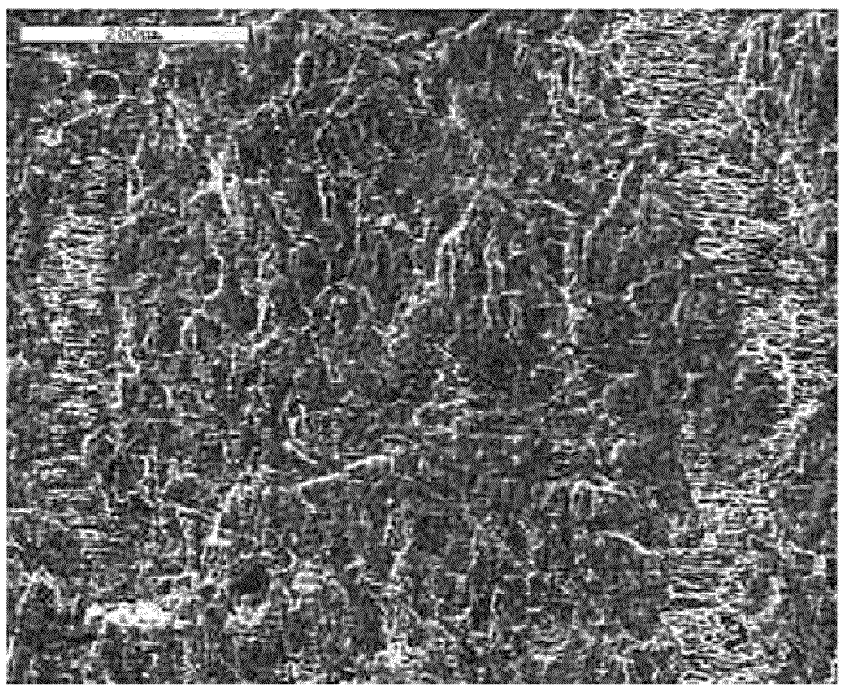
FIG. 5B is an inner surface micrograph of the produced steel plate in Example 1 by peeling off one piece of sheet after tensile test, indicating multiple cracking in the inner surface of the interface.
Figure 6A:
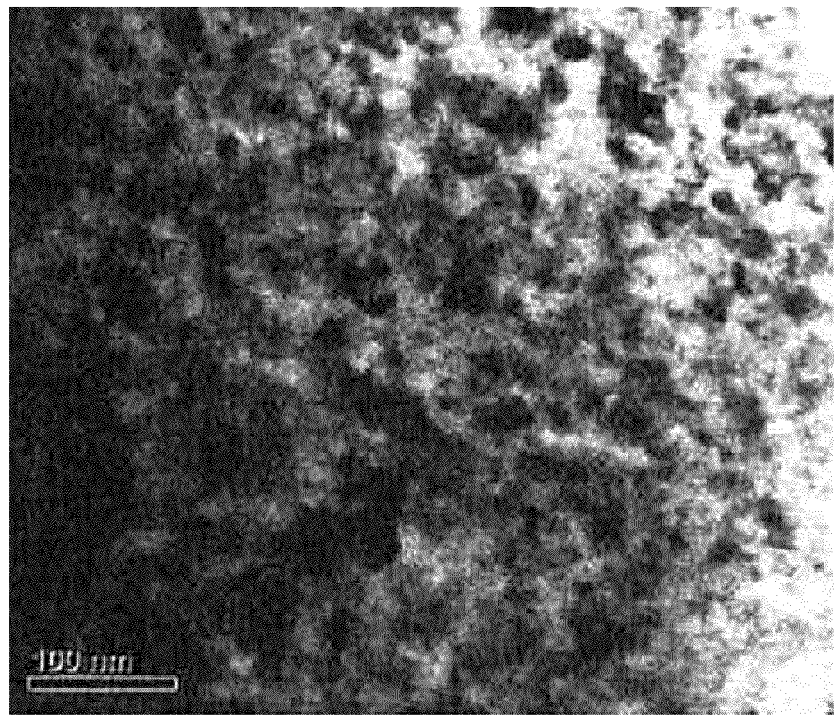
FIG. 6A is a transmission electron micrograph of nanocrystalline at 5 μm depth of surface of the produced steel plate in Example 2.
Figure 6B:
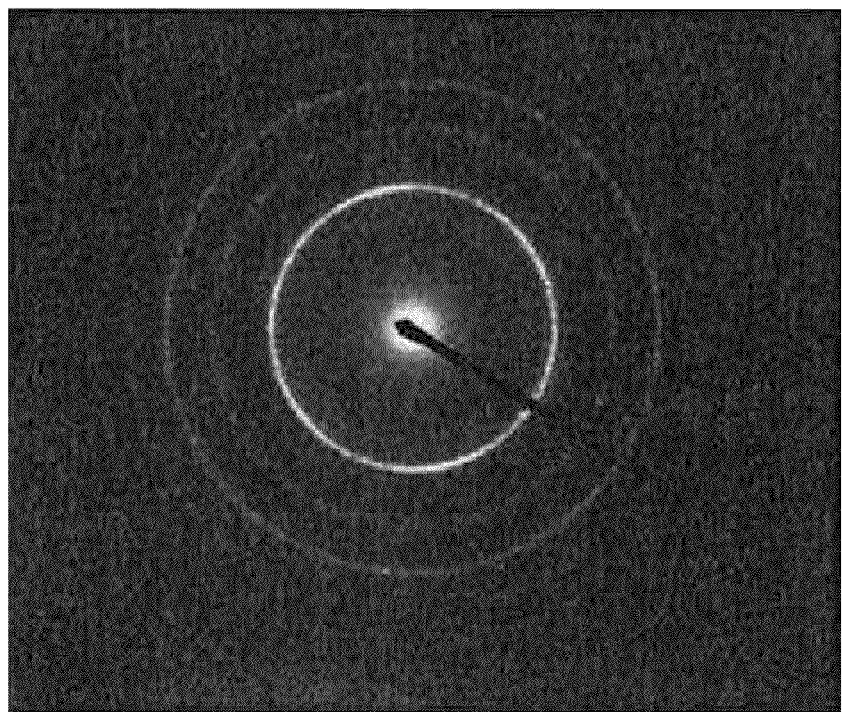
FIG. 6B is a selected area election diffraction (SAED) pattern of FIG. 5A in 5 μm depth of surface of the produced steel plate in Example 2.
Figure 7A:
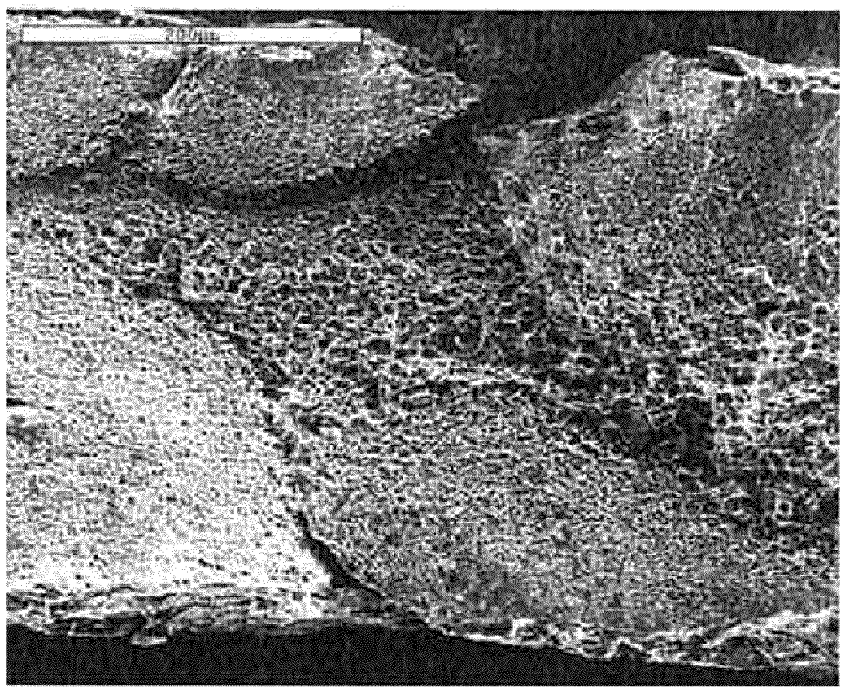
FIG. 7A is a fracture micrograph of the middle piece of the produced steel plated in Example 3 after tensile test, indicating the crack deflecting and blunting.
Figure 7B:
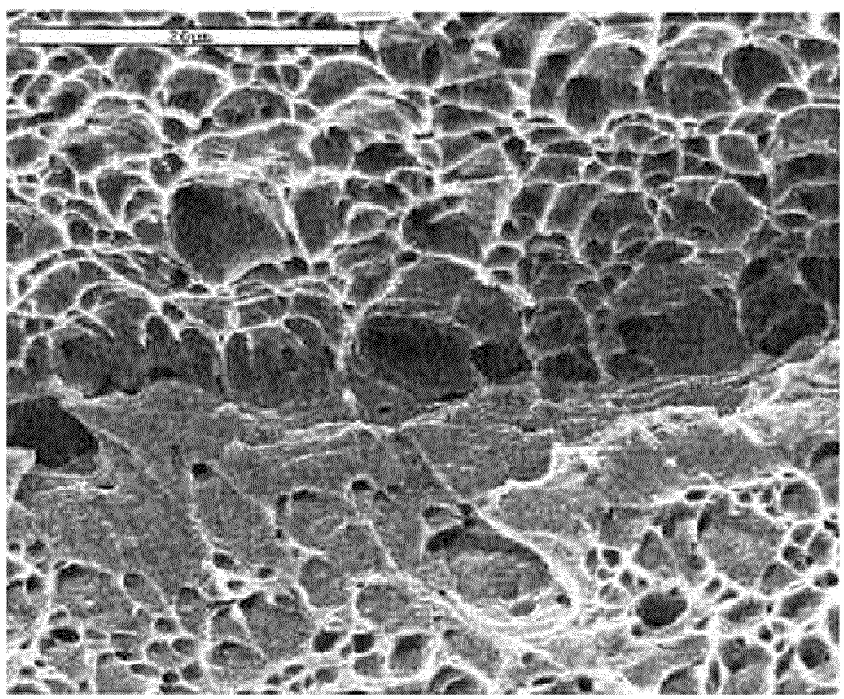
FIG. 7B is a magnification of fracture micrograph of the middle pieces of the produced steel plated in Example 3 after tensile test, indicating the crack blunting by the graded structure.
Figure 8A:
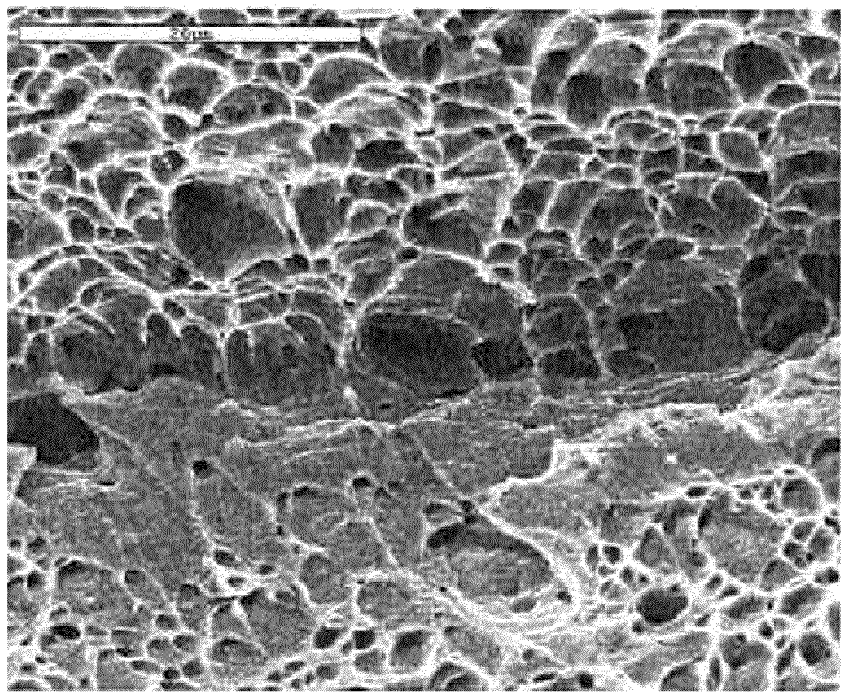
FIG. 8A is a transmission electron micrograph of nanocrystalline in 40 μm depth of surface of the produced steel plate in Example 5.
Figure 8B:
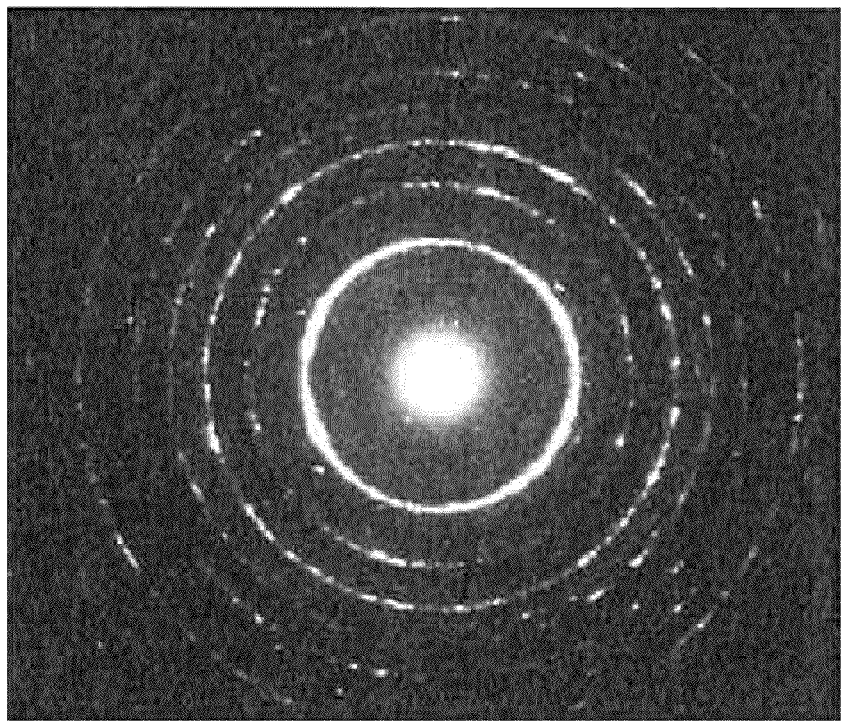
FIG. 8B is a selected area election diffraction (SAED) pattern of FIG. 7A in 40 μm depth of surface of the produced steel plate in Example 5.

FIG. 2 illustrates a preferred embodiment of a steel plate according to the invention. The steel plate has a composition which comprises periodically varying grain size through the thickness of the steel plate. The grain size varies periodically from nanocrystalline composition gradually to a micron grained composition and gradually back to a nanocrystalline composition and so on. The composition of the plate varies periodically through at least two layers of the nanocrystalline and micron grain size. In the preferred embodiment the entire thickness composition of the plate varies periodically between nanocrystalline and micron grained. In alternative embodiments only portions of the thickness composition of the plate varies between nanocrystalline and micron grained, which other portions of the plate composition consisting of areas of uniform grain size. In yet further embodiments the period nature of the variations between nanocrystalline and micron grained composition may be asymmetric, such that the depth between adjacent nanocrystalline and micron grained regions, or consecutive nanocrystalline or micron grained regions, is not uniform.

Five characteristic can be designed to achieve excellent mechanical properties: 1) the nanocrystallines and ultra-fine grains endow the super high strength; 2) the micron grains provide the ductility by the dislocation accumulation; 3) the graded transition of different grain size changes the direction of crack propagation, which initiated in the nanocrystalline layer of the rolling interface; 4) the optimized compressive residual stress profile induces by surface nanocrystallized treatment and co-rolling arrests the cracks; 5) Most importantly, the proper interface strength controls the nucleation and crack propagation to improve further the ductility and toughness. Under the above factors co-activating, a non-localized deformation is formed resulting in a large ductility with high strength. The integrated mechanical properties can be manipulated by the volume fraction of the nanocrystalline and micron grain, gradient of different grain size, interface strength, and compressive residual stress profile.

Figure 1:
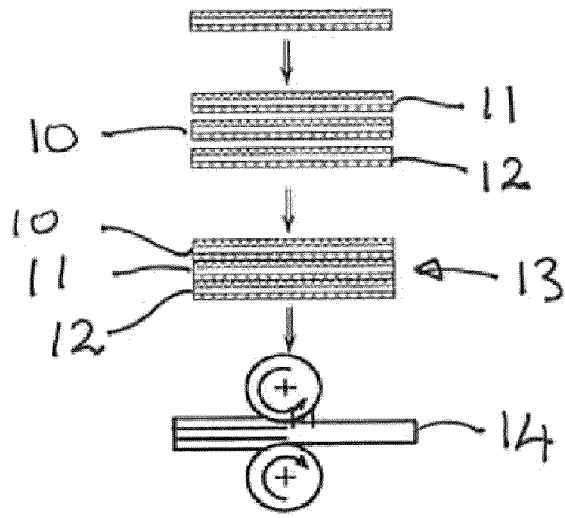
FIG. 1 is a schematic illustration of a steel plate according to the invention.

FIG. 1 illustrates a preferred method of making a steel plate according to the invention. Two or more, in the illustrated embodiment there are three, steel sheets 10, 11, 12 are subjected to nanocrystallized treatment to induce nanocrystalline structures in both surfaces of the sheets 10, 11, 12 with the sheet composition transitioning gradually to micron grained at the centre of each sheet 10, 11, 12. The sheets 10, 11, 12 are then stacked 13. The stacked sheets 13 are then heated and co-rolled to form a steel plate 14 comprising a structure consisting of periodic layers of nanocrystalline and micron grain composition. In the preferred embodiment three sheets are rolled to form the plate. However, in alternative embodiments any number of sheets can be rolled, but preferably there should be an odd number of sheets (i.e. 3, 5, 7, 9 etc). Using an odd number of sheets results in the maximum shear stress not being located at the sheet interfaces. Also in the preferred embodiment only a single pass to roll the sheets to the desired thickness.

More particularly, a preferred embodiment of the invention comprises the following steps:

(1). A plurality of steel sheets are greased, cleaned, and dried to obtain fresh surface.

(2). The sheets are then subjected to a surface nanocrystallized treatment to induce nanocrystalline. The treated sheets are composed of nanocrystalline surface and micron grained layer in interior, where the grain size transits with graded increase from the surface to the interior. The whole surface of the plates can be treated, or part of surface with patterns, such as bands, nets, intersections can be used. The roughness level of the sheet surface can be magnified by the surface nanocrystallized treatment, and can also be controlled by other processing, such as shot peening or buffling. The treated sheets can also be modified by hybrid surface, such as nitriding, chromising, carburizing, to induce special phase structures, or can be not modified.

(3). The sheets are stacked according to the different requirements to obtain alternate distribution of nanocrystalline layer and micron grained layer. The stacking manner can be used to select: i) the surface nanocrystallized sheets, ii) the surface nanocrystallized sheets with untreated sheets, iii) sheets with different thickness, iv) the sheets with different materials, v) the number of the sheets, and vi) placed in symmetry or asymmetry manner.

(4). The stacked sheets are heated to between room temperature and 0.5 Tm (where Tm is the lowest melting point of different materials). The heating duration is in the range of 5 to 90 minutes.

(5). The stacked sheets are co-rolled. This processing can be conducted at cold rolling, or warm rolling. The rolling pass can be a single pass, or multiple passes to gain the proper interface strength between the sheets.

(6). The rolling process can be repeated several passes to obtain different interface strength between the interlayers.

(7). The obtained plate can then be annealed at a temperature of between 150 C-0.5 T1.

A steel plate according to the invention has the following features:

(i). High strength and high toughness. The microstructure of this layered nanostructure plates consists of nanocrystalline (d<100 nm) and ultrafine grain (d<500 nm), which provide the strengthening of refinement to achieve high strength and toughness. The strength is enhanced obviously companied with the increase of the volume fraction of nanocrystalline and ultrafine grain.

(ii). Large ductility. The excellent ductility originates from the microstructure design, including: the micron grained layer, the graded transition of different grain sizes, the compressive residual stress, and the interface strength.

(iii). Controllable microstructure. The microstructure can be manipulated by the stacked manner and co-rolling processing to implement the different volume fraction of nanocrystalline, and the special structure of surface layer and interior layer by replacing the materials.

(iv). Controllable and stable mechanical properties. The mechanical properties of the layered nanostructure plates are controllable by manipulating the microstructure, further, the nanocomposite exhibits good thermal stability on the condition of the warm co-rolling and annealing subsequently.

(v). Simple processing technique. This technique by combining the advanced surface nanocrystallized treatment with convention rolling develops a novel nanocomposite with simple process, low cost, and simple device.

(vi). Environment-friendly materials. This nanocomposite is strengthened by the refinement, and no alloying, which economizes noble metals, easy to recycle, and meet the demands of sustainable development.

Advantages of the invention include:

I) Comparison with alloy strengthening: This technique is an environment8 friendly processing, which avoids the alloying of noble metals resulting in the lower cost and lower load of devices. It is an environment-friendly material for sustainable development.

II) Comparison with the strengthening of ultra-fine grains. The grain size of ultra-fine grains is generally said to be about 1 µm, therefore, the effect of strengthening is limited relative to nanocrystalline. Moreover, the bulk ultra-fine grained materials present the tendency of transition from ductility to brittleness, which means the potential safety hazard. This invention introduces a layered nanostructure plate, which makes full advantage of nanocrystalline strengthening and avoids the deterioration of plasticity by the layered nanostructure.

III) Comparison with surface nanocrystallized technique. This producing technique can markedly enhance the strength of bulk materials and control the microstructure for practical application. Conversely, the surface nanocrystallized technique is more favorable for the improvement of surface properties, such as hardness, wear.

This technology is also able to co-roll other combination of nanostructured materials, for example Nitrided Stainless Steel+Nitrided Ti+ SMATed Al.

The following worked example are given to further illustrate the method of making a steel plate according to the invention and the characteristics of a steel plate so made.

Example 1

The layered nanostructure AISI 304 stainless steel plate was produced: I) the plates were degreased, cleaned, and dried. II) The cleaned plates were conduced by surface mechanical attrition treatment to obtain surface nanocrystallized layer with thickness of 10 µm-20 um. III) Three pieces of surface nanocrystallized 304ss with dual sides were stacked. IV) The stacked plates were heated to 400° C. for 30 min, and warm co-rolled at 400° C. to area reduction 40% in single pass.

The microstructure of the produced plated was composed of nanocrystalline layer/micron grained layer/nanocrystalline layer/interface/nanocrystalline layer/micron grained layer/nanocrystalline layer/interface/nanocrystalline layer/micron grained layer/nanocrystalline layer. The volume fraction of nanocrystalline (d<100 nm) and ultra-fine grain (d<500 tm) was about 30%. The compressive residual stress with 30 µm was high up to 1000 MPa. The yield strength reached 705 MPa, about 2.5 times that of the matrix. Moreover, the elongation to fracture was as high as 48.5%, which exhibited excellent ductility with high strength.

Example 2

The processing of layered nanostructure AISI 304 stainless steel plate was involved: I) the plates were degreased, cleaned, and dried. II) The cleaned plates were conduced by surface mechanical attrition treatment to obtain surface nanocrystallized layer in dual sides with thickness of 20 µm-50 µm; III) Two pieces of surface nanocrystallized 304ss and one piece of untreated AISI 304ss were stacked, where the untreated plate was placed in centre to obtain the stacked structure of: nanocrystalline layer/micron grained layer/nanocrystalline layer/interface/coarse grained layer/interface/nanocrystalline layer/micron grained layer/nanocrystalline layer. IV) The stacked plates were heated to 400° C. for 10 min, and warm co-rolled at 400° C. to area reduction 40% in single pass.

The yield strength was high up to 649 MPa, which increased 125% that of the matrix (288 MPa). The elongation to fracture was about 28.5%.

Example 3

The processing of layered nanostructure AISI 304 stainless steel plate was involved: I) the plates were degreased, cleaned, and dried. II) The cleaned plates were conduced by surface mechanical attrition treatment to obtain surface nanocrystallized layer with thickness of 10 µm-50 µm. III) Two pieces of surface nanocrystallized 304ss with single side and one piece of surface nanocrystallized 304ss with dual sides were stacked, where the treated plate in dual sides was placed in centre with the surface nanocrystallized layer inside of the other two single treated plates, i.e. the stacked structure was: coarse grained layer/nanocrystalline layer/interface/nanocrystalline layer/micron grained layer/nanocrystalline layer/interface/nanocrystalline layer/coarse grained layer. IV) The stacked plates were heated to 700° C. for 20 min, and warm co-rolled at 700° C. to area reduction 45% in single pass.

The yield strength was high up to 790 MPa, which increased 174% that of the matrix (288 MPa). The elongation to fracture was about 25%. The combination of high strength and large ductility was achieved.

Example 4

The processing of layered nanostructured AISI 304 stainless steel plate was involved: I) the plates were degreased, cleaned, and dried. II) The cleaned plates were conduced by surface mechanical attrition treatment to obtain surface nanocrystallized layer with thickness of 20 µm-50 µm; III) Three pieces of surface nanocrystallized 304ss with dual sides were stacked. IV) The stacked plates were heated to 600° C. for 60 min, and warm co-rolled at 600° C. to accumulative reduction 60% in three passes.

The observations of microstructure shown that the grain size was from 1 tm to 5 tm of micron grains, and about 90 nm of nanocrystallines in continuous distribution according to the SEM observations and TEM images in transverse direction. The total volume fraction of nanocrystalline (d<100 nm) layers was about 30%, and nearly 40% for the nanocrystalline and ultra-fine grains (d<500 nm) layer. The yield strength was as high as 960 MPa, more than three times of that of the matrix. The elongation to fracture reached 22%.

Example 5

The layered nanostructure sheets produced in example 4 was annealed at 600° C. for 40 mm. The analysis of microstructure after annealing shown that the nanocrystalline and micron grain did not obviously grow up, and exhibited good stability of grain size. Dislocations and internal stress were partly reduced. The yield strength of the layered nanostructure sheet after annealing reached 908 MPa, about 3.1 times that of the matrix. Moreover, the elongation to fracture was 20%.

What is claimed is:

1. A method for producing a composite steel plate comprising:
   treating a first steel sheet to produce a crystalline grain structure, in the first steel sheet, that varies, in a depthwise direction of the first steel sheet, between nanocrystalline at a first surface of the first steel sheet and micron grained in the interior of the first steel sheet,
   stacking the first steel sheet that has been treated on a second steel sheet that has a coarse grain crystalline structure that is uniform in a depthwise direction of the second steel sheet, with the first surface of the first steel sheet in contact with the second steel sheet, and
   rolling the first and second steel sheets together to form a plate.

2. The method of claim 1, wherein
   treating the first steel sheet to produce the crystalline grain structure in the first steel sheet that varies in a depthwise direction comprises mechanically inducing nanocrystalline layers in the first surface and a second surface of the first steel sheet, and
   the second surface is opposite the first surface, so that the crystalline grain structure varies smoothly from the first and second surfaces of the first steel sheet to micron grained at a center of the first steel sheet.

3. The method of claim 1, wherein
   treating the first steel sheet to produce the crystalline grain structure in the first steel sheet that varies in a depthwise direction comprises mechanically inducing a nanocrystalline grain structure at the first surface of the first steel sheet so that the crystalline grain structure varies smoothly from the first surface of the first steel sheet to micron grained at a second surface of the first steel sheet, and
   the second surface of the first steel sheet is opposite the first surface of the first steel sheet.

4. The method of claim 1 further including, prior to rolling and after stacking, heating the first and second steel sheets to a temperature between room temperature and 0.5 Tm, wherein Tm is the melting point of the first steel sheet.

5. The method of claim 4 including, after stacking, heating the first and second steel sheets to a temperature between 150° C. and 0.4 Tm.

6. The method of claim 1, wherein rolling comprises cold co-rolling.

7. The method of claim 1 further comprising repeating the rolling until the plate has a required thickness.

8. The method of claim 1 including rolling the first and second steel sheets at a temperature between 150° C. to 0.5 Tm, wherein Tm is the melting point of the first steel sheet.

9. The method of claim 1 further comprising annealing the plate.

10. The method of claim 9 including annealing the plate at a temperature between 150° C. to 0.5 Tm, wherein Tm is the melting point of the first steel sheet.

11. The method of claim 1 including
    treating a third steel sheet to produce a crystalline grain structure, in the third steel sheet, that varies, in a depthwise direction of the third steel sheet, between nanocrystalline at a first surface of the third steel sheet and micron grained in the interior of the third steel sheet,
    stacking the first, second, and third steel sheets, in that order, with the first surfaces of the first and third steel sheets in contact with respective surfaces of the second steel sheet, and
    rolling the first, second, and third steel sheets, as stacked, to form a plate.

12. The method of claim 11 further including, prior to rolling and after stacking, heating the first, second, and third steel sheets to a temperature between room temperature and 0.5 Tm, wherein Tm is the melting point of the first steel sheet.

13. The method of claim 11, wherein
    treating the first and third steel sheets to produce the crystalline grain structure in the first and third steel sheets that varies in a depthwise direction comprises mechanically inducing nanocrystalline layers in the first surface and a second surface of each of the first and third steel sheets and
    the second surfaces of the first and third steel sheets are opposite the respective first surfaces of the first and third steel sheets, so that the crystalline grain structure varies smoothly from the first and second surfaces of the first and third steel sheets to micron grained at a center of each of the first and third steel sheets.

14. The method of claim 1, wherein rolling comprises warm co-rolling.

15. A method for producing a composite steel plate comprising:
    treating first and second steel sheets to produce a crystalline grain structure, in the first and second steel sheets, that varies, in a depthwise direction of the first and second steel sheets, between nanocrystalline at a first surface of the first and second steel sheets and micron grained in the interior of the first and second steel sheets,
    stacking the first and second steel sheets, with the first surfaces of the first and second steel sheets in contact with each other, and
    rolling the first and second steel sheets together to form a plate.

16. The method of claim 15, wherein
    treating the first and second steel sheets to produce the crystalline grain structure in the first and second steel sheets that varies in a depthwise direction comprises mechanically inducing nanocrystalline layers in the first surface and a second surface of the first and second steel sheets, and
    the second surfaces of the first and second steel sheets are opposite the respective first surfaces of the first and second steel sheets, so that the crystalline grain structure varies smoothly from the first and second surfaces of each of the first and second steel sheets to micron grained at a center of each of the first and second steel sheets.

17. The method of claim 15, wherein
treating the first and second steel sheets to produce the crystalline grain structure in the first and second steel sheets that varies in a depthwise direction comprises mechanically inducing a nanocrystalline grain structure at the first surfaces of each of the first and second steel sheets so that the crystalline grain structure varies smoothly from the first surfaces of the first and second steel sheets to micron grained at a second surface of each of the first and second steel sheets, and
the respective second surfaces of the first and second steel sheets are opposite the first surfaces of the first and second steel sheets.

18. The method of claim 15 including
treating a third steel sheet to produce a crystalline grain structure, in the third steel sheet, that varies, in a depthwise direction of the third steel sheet, between nanocrystalline at a first surface of the third steel sheet and micron grained in the interior of the third steel sheet,
stacking the first, second, and third steel sheets, in that order, with the first surfaces of the first and third steel sheets in contact with respective surfaces of the second steel sheet, and
rolling the first, second, and third steel sheets, as stacked, to form a plate.

19. The method of claim 15 including
treating a third steel sheet to produce a crystalline grain structure, in the third steel sheet, that varies, in a depthwise direction of the third steel sheet, between nanocrystalline at a first surface of the third steel sheet and micron grained in the interior of the third steel sheet, wherein
treating the first and third steel sheets to produce the crystalline grain structure in the first and third steel sheets that varies in a depthwise direction comprises mechanically inducing a nanocrystalline grain structure at the first surfaces of each of the first and third steel sheets so that the crystalline grain structure varies smoothly from the first surfaces of the first and third steel sheets to micron grained at a second surface of each of the first and third steel sheets, and
the respective second surfaces of the first and second steel sheets are opposite the first surfaces of the first and second steel sheets,
stacking the first, second, and third steel sheets, in that order, with the first surfaces of the first and third steel sheets in contact with respective surfaces of the second steel sheet, and
rolling the first, second, and third steel sheets, as stacked, to form a plate.

20. The method of claim 18, wherein treating the first steel sheet to produce the crystalline grain structure in the first steel sheet that varies in a depthwise direction comprises mechanically inducing nanocrystalline layers in the first surface and a second surface of the first steel sheet, wherein the second surface is opposite the first surface, so that the crystalline grain structure varies smoothly from the first and second surfaces of the first steel sheet to micron grained at a center of the first steel sheet.

21. The method of claim 18, wherein
treating the first, second, and third steel sheets to produce the crystalline grain structure in the first, second, and third steel sheets that varies in a depthwise direction comprises mechanically inducing nanocrystalline layers in the first surface and a second surface of each of the first, second, and third steel sheets, and
the second surfaces of the first, second, and third steel sheets are opposite the respective first surfaces of the first, second, and third steel sheets so that the crystalline grain structure varies smoothly from the first and second surfaces of the first, second, and third steel sheets to micron grained at a center of each of the first, second, and third steel sheets.

* * * * *